US006584797B1

(12) United States Patent
Smith et al.

(10) Patent No.: US 6,584,797 B1
(45) Date of Patent: Jul. 1, 2003

(54) TEMPERATURE-CONTROLLED SHIPPING CONTAINER AND METHOD FOR USING SAME

(75) Inventors: Douglas M. Smith, Albuquerque, NM (US); Kevin H. Roderick, Albuquerque, NM (US)

(73) Assignee: Nanopore, Inc., Albuquerque, NM (US)

( * ) Notice: Subject to any disclaimer, the term of this patent is extended or adjusted under 35 U.S.C. 154(b) by 0 days.

(21) Appl. No.: 09/876,841

(22) Filed: Jun. 6, 2001

(51) Int. Cl.[7] .............................. F25D 3/08; F17C 13/00
(52) U.S. Cl. ........................................ 62/371; 62/457.9
(58) Field of Search .............................. 62/371, 457.9, 62/457.7, 238.1, 238.3, 494, 476, 480 101, 109

(56) References Cited

U.S. PATENT DOCUMENTS

| | | | |
|---|---|---|---|
| 2,088,276 A | * 7/1937 | Nesselmann et al. | |
| 4,048,810 A | 9/1977 | Zeilon | 62/101 |
| 4,205,531 A | 6/1980 | Brunberg et al. | 62/101 |
| 4,250,720 A | 2/1981 | Siegel | 62/480 |
| 4,736,599 A | 4/1988 | Siegel | 62/294 |
| 4,742,868 A | 5/1988 | Mitani et al. | 165/104.12 |
| 4,752,310 A | 6/1988 | Maier-Laxhuber et al. | 62/4 |
| 4,759,191 A | 7/1988 | Thomas et al. | 62/101 |
| 4,928,495 A | 5/1990 | Siegel | 62/4 |
| 5,038,581 A | 8/1991 | Maier-Laxhuber et al. | 62/457.9 |
| 5,048,301 A | 9/1991 | Sabin et al. | 62/101 |
| 5,088,302 A | 2/1992 | Tomizawa et al. | 62/480 |
| 5,186,020 A | 2/1993 | Rockenfeller et al. | 62/457.9 |
| 5,269,293 A | 12/1993 | Loser et al. | 128/204.15 |
| 5,291,942 A | * 3/1994 | Ryan | 62/480 X |
| 5,309,985 A | * 5/1994 | Erickson | 62/480 X |
| 5,355,684 A | 10/1994 | Guice | 62/54.2 |
| 5,440,896 A | 8/1995 | Maier-Laxhuber et al. | 62/269 |
| 5,628,205 A | * 5/1997 | Rockenfeller et al. | 62/480 |
| 5,660,049 A | * 8/1997 | Erickson | 62/494 X |
| 5,802,870 A | * 9/1998 | Arnold et al. | 62/480 |
| 5,816,069 A | 10/1998 | Ebbeson | 62/457.9 |
| 5,924,302 A | 7/1999 | Derifield | 62/457.2 |
| 5,943,876 A | 8/1999 | Meyer et al. | 62/371 |
| 5,950,450 A | 9/1999 | Meyer et al. | 62/457.9 |
| 6,192,703 B1 | 2/2001 | Salyer et al. | 62/457 |
| 6,438,992 B1 | 8/2002 | Smith et al. | 62/480 |

FOREIGN PATENT DOCUMENTS

GB  2095386  9/1982

OTHER PUBLICATIONS

Pending patent application Ser. No. 09/691,371; Entitled "Desiccant Composition"; Smith et al.; Filed Oct. 18, 2000.
Pending patent application Ser. No. 10/046,662; Entitled "Cooling Device"; Roderick; filed on Oct. 26, 2001.
Pending patent application Ser. No. 10/165,753; Entitled "Temperature Controlled Shipping Containers"; Smith et al.; filed on Jun. 6, 2002.
Pending patent application Ser. No. 10/165,758; Entitled "Sorption Cooling Devices and Temperature–Controlled Shipping Containers Incorporating Sorption Cooling Devices"; Smith et al.; filed on Jun. 6, 2002.

* cited by examiner

*Primary Examiner*—Chen Wen Jiang
(74) *Attorney, Agent, or Firm*—Marsh Fischmann & Breyfogle LLP

(57) ABSTRACT

A temperature-controlled container utilizing a sorption cooling unit to maintain the temperature within the container. The sorption cooling unit cools the interior of the container and rejects waste heat to the exterior. The sorption cooling unit provides a lightweight and low volume alternative to the traditional gel pack cooling systems that are commonly used in the modern shipping industry for shipping containers.

42 Claims, 9 Drawing Sheets

TEMPERATURE-CONTROLLED SHIPPING CONTAINER AND METHOD FOR USING SAME

BACKGROUND OF THE INVENTION

1. Field of the Invention

The present invention is directed to temperature-controlled shipping containers and methods for transporting products utilizing temperature-controlled shipping containers. In particular, the present invention is directed to temperature-controlled shipping containers that include a sorption cooling unit to maintain the internal temperature of the shipping container below ambient temperature.

2. Description of Related Art

The shipment of products that must have their temperature maintained within a specific range below ambient is one of the fastest growing market segments in the modern shipping industry. This growth is driven by a number of factors including widespread concerns about safety in the cold food distribution chain, increasing numbers of pharmaceutical and life sciences products which must have their temperature maintained within certain limits, the rapid growth in high-value specialty chemicals such as those used in the semiconductor industry, the increasing number of sophisticated medical tests which require the shipment of patient specimens to an external laboratory, the increased number of clinical trials associated with new pharmaceutical discovery and the increased delivery of products directly to the customer as a result of Internet ordering.

This field is generally referred to as controlled temperature packaging (CTP). CTP can be segmented by the target temperature range, namely: frozen (below 0° C.); 2° to 8° C., and less than ambient (e.g., less than 30° C.). In addition, CTP may be segmented by container size, namely: greater than pallet; one cubic foot to pallet; and less than one cubic foot. Containers having a size greater than pallet are typically cooled by mechanical refrigeration and the shipment times are typically from days to many weeks. The one cubic foot to pallet size segment is dominated by systems using ice (e.g., gel packs) and/or dry ice as a coolant wherein the containers are insulated using expanded polystyrene (EPS). The market segment for containers less than one cubic foot in size is very limited due to an unmet need for a small, lightweight cooling mechanism.

Although many basic ice/EPS systems are in use, there is a wide variation in quality and performance of the packaging depending on the value of the product and the sensitivity of the product to temperature fluctuation. A relatively simple system includes a cardboard box into which EPS sheets have been cut and placed. The container is then filled with dry ice in which, for example, frozen fish is shipped. A more sophisticated approach is a validated system consisting of custom molded EPS forms in a rigid box with both frozen and warm gel packs, the combination of which has been tested through a range of temperature cycles for specified thermal properties. Such a validated system can be used for shipping pharmaceuticals. For example, many pharmaceutical products such as vaccines and antibodies must be maintained at 2° C. to 8° C.

The existing ice/EPS cooling system is unsatisfactory because of increased environmental concerns associated with disposal of large quantities of EPS and gel packs, along with the high cost of shipping. Gel packs also require freezers at the shipping source to maintain the frozen packs. The high cost of shipping is directly related to the high volume associated with the EPS and the high volume and mass associated with the gel packs. As an example, for a one cubic foot box with a 60 hour lifetime at 2° C. to 8° C., over 90 percent of the volume is consumed by EPS and gel packs. Some reduction in volume and shipping costs may be obtained by using vacuum insulation panels (VIPs), but the high cost of VIPs has precluded significant market penetration.

An example of the foregoing system is illustrated in U.S. Pat. No. 5,924,302 by Derifield issued on Jul. 20, 1999. This patent illustrates a shipping container that includes a plurality of cavities adapted to receive a coolant (e.g., gel packs) that surround a cavity adapted to receive an item to be shipped.

Electrically cooled shipping containers are also known, as illustrated in U.S. Pat. No. 6,192,703 by Salyer et al. issued on Feb. 27, 2001. This patent discloses a portable refrigerator unit and storage container employing vacuum insulation panels and a phase change material. Phase change materials undergo a change in physical form (e.g., solid to liquid) thereby absorbing heat from the surrounding environment. A battery driven refrigeration system provides cooling of the shipping container.

There is a need for a temperature-controlled container, such as a shipping container, having a lightweight cooling mechanism that does not occupy a large volume. It would be advantageous if the temperature of the container was controllable over a range of temperatures.

SUMMARY OF THE INVENTION

The present invention is generally directed to a temperature-controlled containers, such as shipping containers.

In one preferred embodiment, a temperature-controlled shipping container is provided that includes at least one sidewall and top and bottom walls defining a cavity that is adapted to contain a product within the cavity. A sorption cooler including an evaporator, an absorber and a vapor passageway disposed between the evaporator and the absorber is provided wherein the evaporator is disposed in thermal communication with the cavity to provide cooling to the cavity. A liquid reservoir is in liquid communication with the evaporator to provide liquid from the liquid reservoir to the evaporator.

According to this embodiment, one of the top, bottom and sidewalls can be fabricated from corrugated cardboard or a more insulative material such as polystyrene or a vacuum insulation panel. For example, at least one of the top, bottom and sidewalls can include a material having an insulative value of at least about R-3.

According to another embodiment of the present invention, a temperature-controlled shipping container is provided which includes an insert having top, bottom and sidewalls defining a cavity within the insert wherein at least one of the top, bottom and sidewalls has an insulative value of at least about R-3. The absorption cooling unit is incorporated in the insert wherein the absorption cooling unit includes an evaporator positioned adjacent to or within the cavity to provide cooling to the cavity. An external container, such as a cardboard container, can be provided to encase the insert. The insert can include insulative materials such as polystyrene or vacuum insulation panels. The absorber of the sorption cooling unit is preferably disposed on an outer surface of the insert to dissipate heat to the exterior of the insert. Accordingly, the container encasing the insert can include venting means to vent the heat generated by the absorber.

According to yet another embodiment, a temperature-controlled container is provided which includes top wall, bottom wall, and at least a first side wall defining a cavity wherein at least one of the top, bottom and side walls has an insulative value of at least about R-3. A sorption cooling unit is provided to provide cooling to the cavity.

According to this embodiment, the top wall, bottom wall or side wall can include polystyrene or a vacuum insulation panel or can be fabricated from cardboard. Further, at least a portion of one of the top, bottom and sidewalls can be defined by the surface of the evaporator which provides cooling to the cavity.

DESCRIPTION OF THE INVENTION

The present invention is directed to containers such as shipping containers and methods for using shipping containers wherein the temperature of the internal cavity of the shipping container is controlled utilizing a sorption cooling unit.

The fundamental operation of a sorption cooling unit is well known. The boiling point of a liquid can be lowered by reducing the pressure over the liquid, such as by placing the liquid in a vacuum. A liquid, for example water, that is under a substantially reduced pressure will boil and absorb heat from the surrounding environment. This absorption of heat creates the desired cooling affect. To prevent the development of high vapor pressure over the boiling liquid, which would stop the boiling of the liquid, the vapor that is generated must be continuously removed and the removal of the vapor must be done without the introduction of outside air. Thus, an absorbent such as a desiccant can be utilized to absorb the vapor and permit the liquid to continue boiling and absorbing heat from the environment. An example of a sorption cooling system is described in U.S. Pat. No. 4,250,720 by Siegel, which is incorporated herein by reference in its entirety.

Figure 1:
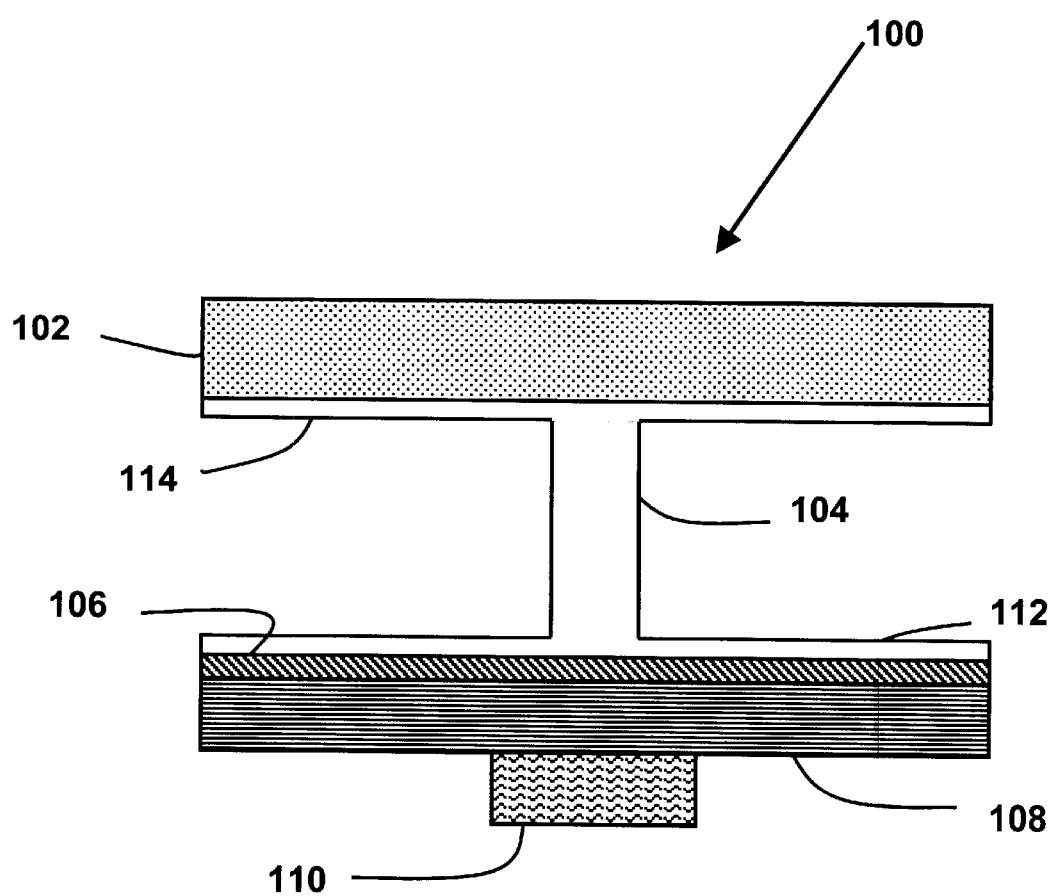
FIG. 1 illustrates a cross-section of a sorption cooling unit in accordance with an embodiment of the present invention.
Figure 2:
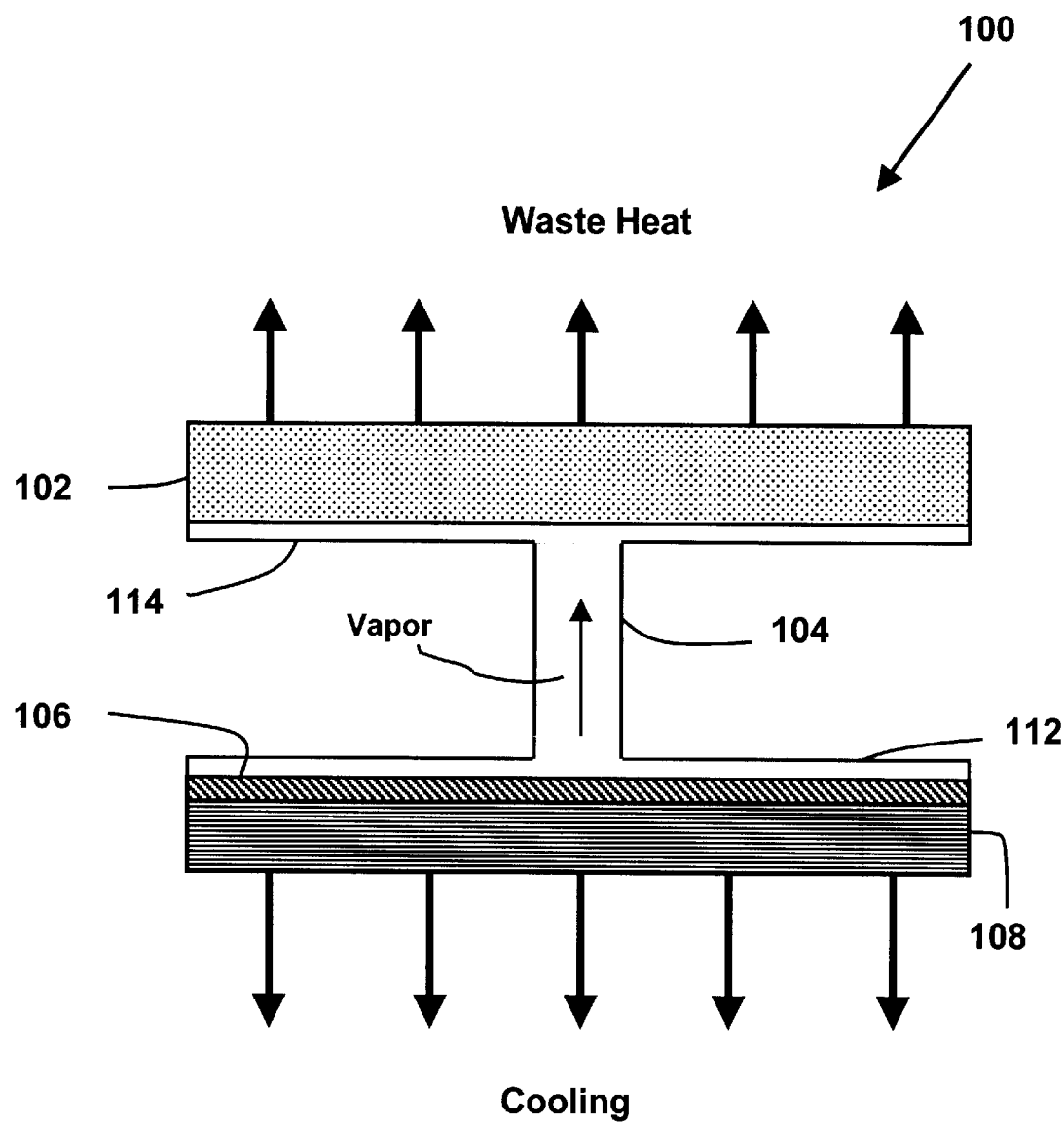
FIG. 2 illustrates a cross-section of a sorption cooling unit in accordance with an embodiment of the present invention.

FIGS. 1 and 2 illustrate a cross-sectional view of a sorption cooling unit that is useful in accordance with the present invention. The sorption cooling unit 100 includes an absorber 102 and an evaporator 108 with a vapor passageway 104 disposed between the evaporator 108 and the absorber 102. A liquid reservoir 110 provides a source of liquid that is delivered to the evaporator 108 upon release of the liquid from the reservoir 110. The liquid evaporates (boils) in the evaporator 108 thereby providing cooling to that side of the unit (FIG. 2). The vapor passes through the vapor passageway 104 and is absorbed by a desiccant located within the absorber 102. The desiccant releases heat that is at least equal to the amount of heat removed at the evaporator.

In order for the released liquid to boil, the sorption cooling unit 100 is maintained at a reduced pressure and preferably is maintained under a substantial vacuum. More particularly, the pressure within the unit is preferably not greater than about 4 mbar. To maintain the reduced pressure and to provide an adequate shelf life for the unit, the sorption cooling unit 100 can be enclosed in an impermeable casing material such as a metallized polyester film to prevent the leakage of gases into the unit.

In operation, the liquid reservoir 110, which is separately maintained at near ambient pressure, is activated to release liquid to the evaporator 108. For example, the liquid reservoir 110 could be a simple polymeric pouch that is punctured to release liquid or a valving mechanism can be used to expose the liquid to the reduced pressure. It will be appreciated that the liquid reservoir 110 can be located at virtually any position in relation to the remainder of the sorption cooling unit, as long as fluid communication is provided from the reservoir to the evaporator 108. In either case, the liquid is exposed to the evaporator 108 and is thereby exposed to a substantial drop in pressure causing the liquid to vaporize.

Liquid that is not immediately vaporized can collect in the interstices of a wicking material that can be disposed in the evaporator 108. The wicking material is configured to draw and maintain a desired amount of liquid for vaporization. Thus, the wicking material should have a pore size that is sufficiently large to permit capillary action to draw the liquid from the reservoir. Further, the wicking material is configured to absorb any vaporized liquid that recondenses. Preferred wicking materials include hydrophilic materials such as microporous metals, porous plastics such as polyethylene and polypropylene, cellulose products and other hydroscopic materials. A particularly preferred wicking material is an absorbent polymer such as polyacrylamide or sodium polyacrylate.

With the liquid to gas phase change, the liquid removes heat from its surroundings that is equal to the latent heat of vaporization of the liquid. The vaporized liquid then passes through the vapor passageway 104 to be absorbed in the absorber 102. An optional vapor permeable membrane 106 can be provided to prevent liquid from migrating to the absorber 102. Examples of suitable membrane materials include various porous films such as TYVEK films (E. I. duPont deNemours Corporation, Wilmington, Del.) and GORETEX films (W. L. Gore and Associates, Newark, Del.). Alternatively, the membrane may be a hydrophilic coating such as SCOTCHGUARD (3M Company). However, such a membrane is typically not required for the sorption cooling unit.

In accordance with the present invention, it is important that the rate of cooling be well-controlled such that the desired temperature range within the shipping container is maintained for a pre-determined amount of time. Therefore, it is important to control the evaporation rate of liquid within the sorption cooling unit 100. To ensure uniform cooling at the evaporator 108, a spacer 112 can be provided to permit evaporation over the entire surface of the evaporator. The spacer 112 can provide an air gap or can be a highly porous material.

One way of controlling the rate of evaporation is to restrict the flow of vapor through the vapor passageway 104. For example, the vapor passageway 104 could be provided with microchannels adapted to restrict the flow of vapor through the vapor passageway. Further, a membrane having a specified pore size or permeability can be provided in the vapor passageway. An active valving mechanism can also be used, such as a bimetallic strip that is responsive to temperature changes. It will be appreciated that other means for restricting vapor flow through the vapor passageway can be utilized. Also, the evaporation rate can be controlled in a similar manner by restricting the flow of liquid from the reservoir 110 to the evaporator 108. Although the vapor passageway 104 is illustrated as an elongated channel, it will be appreciated that the vapor passageway can have virtually any form as long as vapor communication is provided between the evaporator 108 and the absorber 102. For example, the absorber 102 can be located immediately adjacent to the evaporator 108 and separated only by a vapor permeable membrane. However, as will be appreciated from the discussion below, it is preferred that the absorber 102 is offset from the evaporator 108 so that the two components are thermally isolated from each other.

Liquids for use in accordance with the present invention should have a high vapor pressure at ambient temperature so that a reduction of pressure will produce a high vapor production rate. Suitable liquids include ammonia, various alcohols such as methyl alcohol or ethyl alcohol, ketones (e.g., acetone) or aldehydes (e.g., acetaldehyde. Other useful liquids can include chlorofluorocarbons (CFC) or hydrochlorofluorocarbons (HCFC) such as FREON (E.I. Dupont de Nemours, Wilmington, Del.), a series of fluorocarbon products such as FREON C318, FREON 114, FREON 21, FREON 11, FREON 114B2, FREON 113 and FREON 112.

Preferably, the liquid is an aqueous-based liquid and in a particularly preferred embodiment the liquid consists essentially of water. Water is advantageous due to its high heat of vaporization, low cost and low toxicity. However, it may be desirable to include minor amounts of other components in the liquid in order to control the evaporative properties of the liquid. For example, the liquid can be mixed with a component having a low vapor pressure. Further, additives to lower the freezing point of the water can be used.

Suitable additive components could include ethyl alcohol, acetone, methyl alcohol, propyl alcohol and isobutyl alcohol, all of which are miscible with water. For example, a combination of a nucleating agent with a compatible liquid is a combination of 5 percent ethyl alcohol in water or 5 percent acetone in methyl alcohol. Alternatively, solid nucleating agents may be used such as conventional boiling stones used in chemical laboratory applications.

The absorber 102 includes a desiccant that is compatible with the liquid. That is, the desiccant must be capable of absorbing and/or adsorbing the vapor that is formed from the liquid. The desiccant can be contained, for example, in a vapor permeable bag. A spacer 114 can also be provided to ensure even absorption and heating of the dessicant. The mechanism by which the desiccant functions can be a combination of adsorption and absorption and as used herein, the terms absorb, absorption and the like refer to the retention of liquid by the desiccant, regardless of the actual mechanism by which the liquid is retained. The desiccant is preferably of such a nature and quantity as to absorb all of the vaporized liquid. To enhance absorption rates, the desiccant can be activated prior to introduction into the absorber 102. Activation methods can include techniques such as heating the desiccant to remove moisture and/or any non-condensable gases. When the liquid is water, the desiccant preferably absorbs at least about 50 percent of its weight in liquid at a water pressure of 5 mbar, more preferably at least about 75 percent by weight at a pressure of 5 mbar and even more preferably at least about 100 percent by weight at pressure of 5 mbar.

The preferred desiccant will also absorb at least about 20 percent of its weight in water at 10 percent relative humidity, and at least 40 percent of its weight in water at 50 percent relative humidity and ambient temperature. More preferably, the desiccant will absorb at least 40 percent of its weight at 10 percent humidity and 60 percent of its weight at 50 percent relative humidity. Even more preferably, the desiccant will absorb at least about 60 percent of its weight at 10 percent humidity and at least about 80 percent of its weight at 50 percent humidity.

Suitable desiccants include zeolites, barium oxide, activated alumina, silica gel, glycerine, magnesium perchlorate, calcium sulfate, calcium oxide, activated carbon, calcium chloride, glycerine silica gel, alumina gel, calcium hydride, phosphoric anhydride, phosphoric acid, potassium hydroxide and sodium sulfate.

A particularly preferred desiccant in accordance with the present invention is a surface modified porous material. The porous material can be a material such as activated carbon or silica. Preferably, the porous material has a pore volume of at least about 0.8 cc/g and average pore size of from about 1 to about 20 nm. The surface modification can include impregnating the porous material with one or more metal salts such as a metal salt selected from the group consisting of calcium chloride, lithium chloride, lithium bromide, magnesium chloride, calcium nitrate, potassium fluoride and the like. The porous support material is preferably loaded with from about 20 to about 80 weight percent of the metal salt and more preferably from about 40 to about 60 weight percent of the metal salt. Such desiccant compositions are described in detail in U.S. patent application Ser. No. 09/691,371, which is commonly-owned with the present application.

Figure 3:
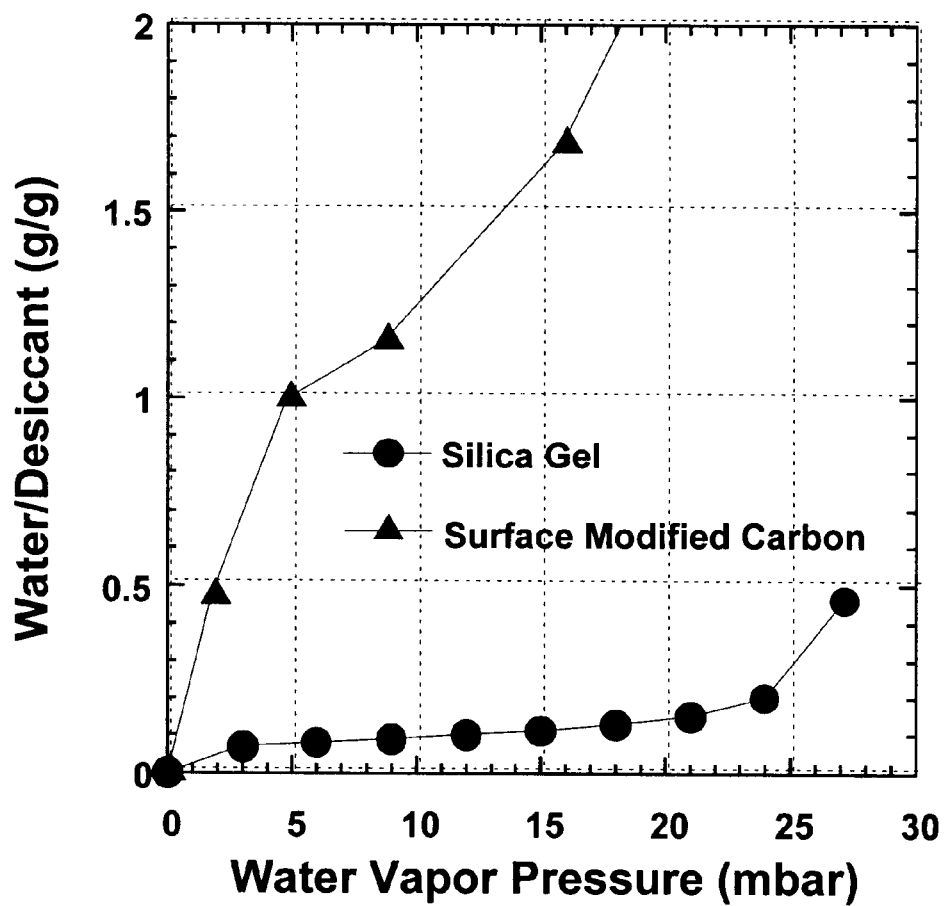
FIG. 3 illustrates the absorption capacity of two different desiccants that are useful in accordance with the present invention.

FIG. 3 illustrates the capacity of a preferred desiccant according to the present invention to absorb water at 24° C. compared to silica gel at various vapor pressures. The surface modified desiccant illustrated in FIG. 3 is a surface modified carbon. The desiccant is formed from activated carbon having lithium chloride impregnated on the activated carbon in a 1:1 mass ratio (i.e., 50 weight percent lithium chloride). To fabricate the desiccant, lithium chloride salt is dissolved in water and dried activated carbon is added to the solution. The solution is adsorbed into the activated carbon and is then dried, leaving the activated carbon impregnated with the lithium chloride. The process can be repeated to increase the loading of lithium chloride, if necessary.

It can be seen that this desiccant has substantially higher water adsorption ability as compared to the silica gel. The use of desiccant compositions having such high absorption capabilities enables the sorption cooling unit to provide high cooling densities, thereby reducing the cost of shipping associated with the container as compared to gel packs and similarly cooled containers.

Figure 4:
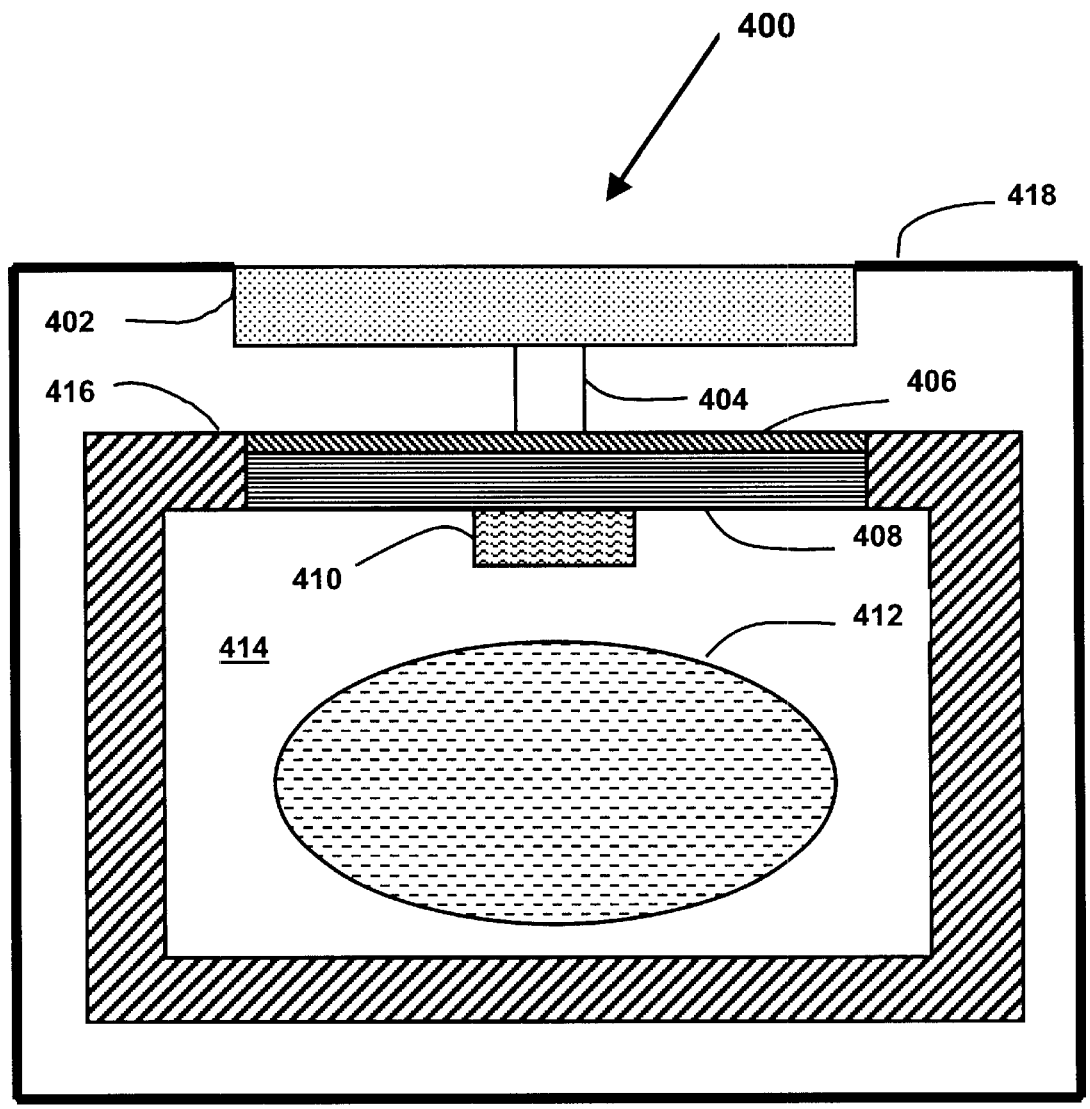
FIG. 4 illustrates a cross-section of a temperature-controlled shipping container in accordance with an embodiment of the present invention.

A sorption cooling unit incorporated into a shipping container in accordance with the present invention is illustrated in FIG. 4. The cooled shipping container 400 includes a sorption cooling unit substantially as described with respect to FIGS. 1 and 2. Although illustrated as a rectangular-shaped box, it will be appreciated that other container configurations can also be utilized such as cylindrical containers and the like.

The evaporator 408 of the sorption cooling unit is in thermal communication with a product 412. The product 412 is disposed within a cavity 414 that is defined by the top, bottom and side walls of an insulated insert 416. In a preferred embodiment, the insulated walls defining the product cavity preferably have an insulative value of at least about R-3 and more preferably at least about R-10. However, it will be appreciated that such highly insulative walls may not be necessary for all applications of the present invention.

If necessary, the insulated insert 416 can be placed in an external container 418, such as a corrugated cardboard box. The absorber 402, which generates heat as liquid is absorbed, can be in thermal communication with the exterior of the external container 418 such that heat is dissipated to the external environment. Alternatively, the absorber could be located outside of the insulated insert 416 and within the external container 418. If the absorber 402 is within the external container 418, venting means such as slots or perforations in the external container 418 can be provided to assist in the dissipation of heat. What is important in accordance with the present invention is that the heat generated at the absorber 402 is thermally isolated from the product cavity so that the product cavity is able to maintain sufficiently cool temperature for a sufficient length of time.

The preferred material for the insulated walls will depend upon the application of the shipping container, such as the relative value of the products being shipped and the cooling requirements associated with the product. Table 1 summarizes the properties of four available materials: corrugated cardboard; expanded polystyrene (EPS); polyurethane; and vacuum insulated panels (VIPs).

TABLE 1

Examples of Insulative Materials

| Material | Thermal Conductivity (W/mK) | Recyclability | Formability | Relative Cost |
|---|---|---|---|---|
| Corrugated Cardboard | ~0.05 | High | Yes | Low |
| EPS | 0.035 | Moderate | Yes | Low |
| Polyurethane | 0.025 | Difficult | Yes | Medium |
| VIPs | <0.006 | Varies | No | Very High |

For example, the insulated container 416 can include EPS as the sidewall material where the product 412 is a relatively low-value commodity that is sensitive to increased costs. EPS has the advantage that it has a low-cost and is easily formed into a variety of shapes. However, to ensure sufficient insulation, a relatively thick amount of EPS is typically used. Further, there are environmental concerns with respect to the use of EPS.

VIPs have a very low thermal conductivity and therefore can be utilized in thinner sections than, for example, EPS. However, VIPs have a relatively high cost and would typically be used for high value commodities such as pharmaceuticals and medical specimens.

Figure 5:
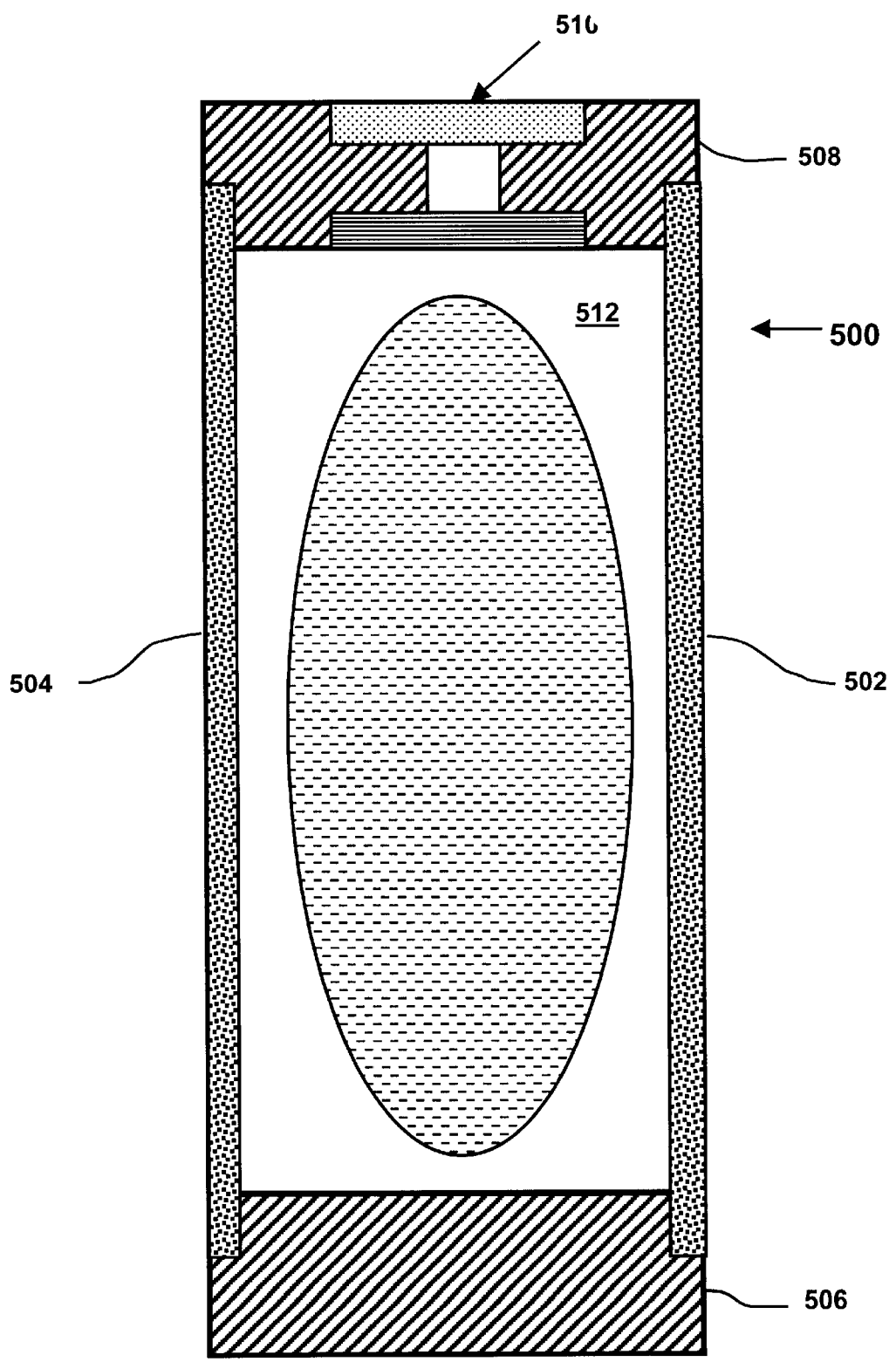
FIG. 5 illustrates a cross-section of a temperature-controlled shipping container in accordance with an embodiment of the present invention.

It will be appreciated that combinations of two or more insulated materials can also be utilized. For example, VIPs could be utilized in the thin areas of the cargo area with EPS at the opposite sides. FIG. 5 illustrates a cross-sectional view of an insulated shipping container insert in accordance with an embodiment of the present invention. The insulated shipping container insert 500 includes vacuum insulation panels 502 and 504 on the opposite sides of the insert, it thereby maximizing the volume of space in the product cavity 512. The bottom insulator 506 is fabricated from expanded polystyrene. The top insulator 508 is also fabricated from expanded polystyrene and includes a sorption cooling unit 510 to maintain a reduced temperature within the product cavity 512.

According to one embodiment of the present invention, the sorption cooling unit is disposable. That is, the sorption cooling unit can be adapted to be used and then thrown away. Alternatively, the sorption cooling unit can be partially or wholly recyclable. In order to recycle the sorption cooling unit, the desiccant in the absorber must be regenerated or replaced. Regeneration of the desiccant entails removing liquid from the desiccant by either heating the desiccant, subjecting the desiccant to a vacuum or both. Further, additional liquid must be provided to the sorption cooling unit for subsequent use.

The desiccant can be regenerated either by removing the desiccant from the unit or by regenerating the desiccant in-situ. For example, the entire sorption cooling unit can be returned to the manufacturer where it is dismantled and the desiccant is removed and regenerated for use in new cooling units. Alternatively, the absorber can be designed as a removable piece of the sorption unit. This piece would then be returned and the desiccant removed and regenerated as described above. Regenerated desiccant can then be placed in new desiccant packs which can be packaged and placed into existing units. According to yet a further embodiment, the absorber unit can be packaged, such as in a rigid container, and can be regenerated in-situ by opening a valve in the unit and placing the entire unit in either an oven or a vacuum. Also, an integral heating unit could be provided with the absorber whereby the heating unit can be activated to regenerate the desiccant in-situ.

Figure 6:
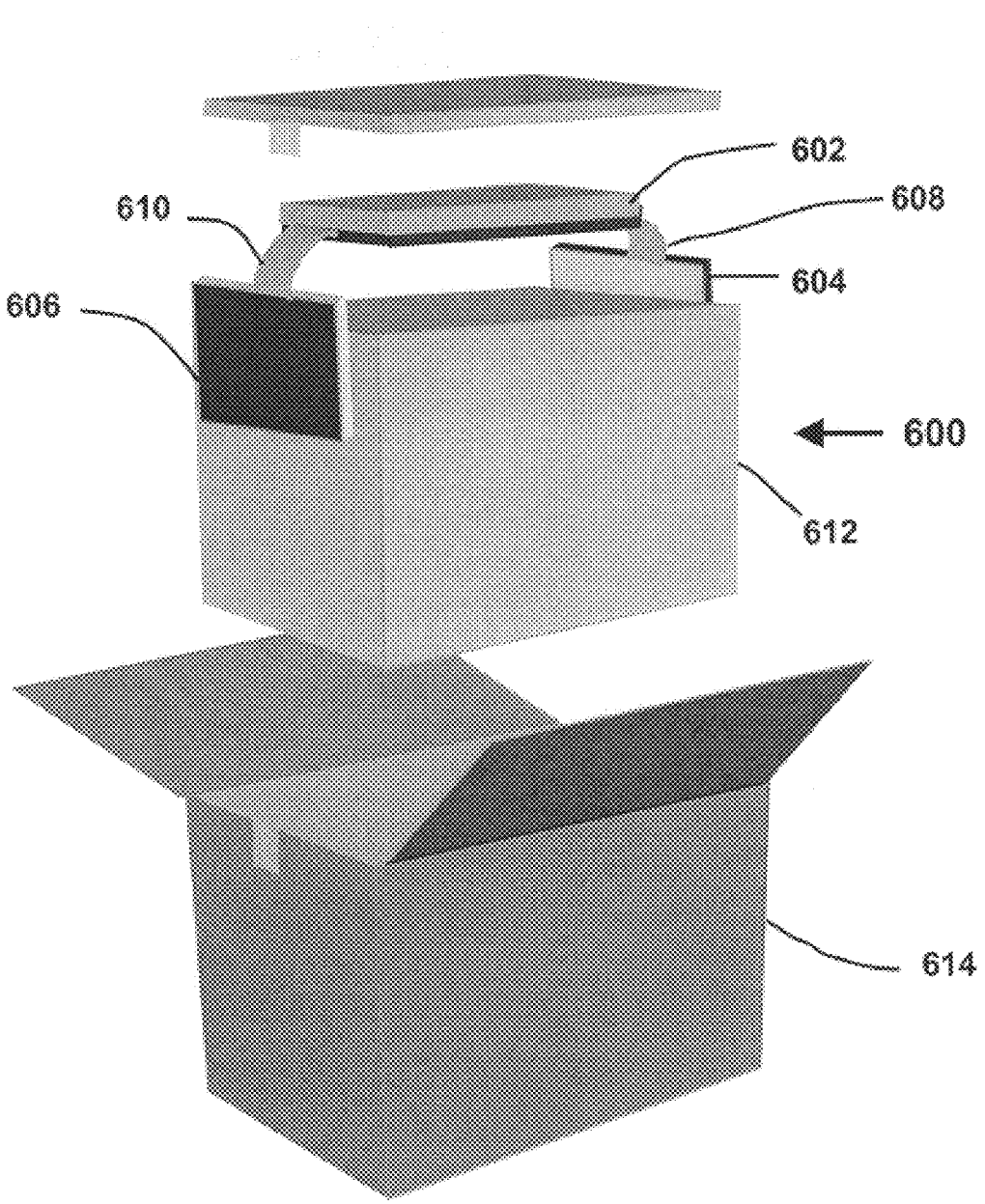
FIG. 6 illustrates a perspective view of a temperature-controlled shipping container in accordance with an embodiment of the present invention.

FIG. 6 illustrates yet another embodiment of the present invention wherein the cooling capacity of the cooling unit is enhanced by utilizing two absorbers. Specifically, FIG. 6 illustrates a shipping container 600 which includes a sorption cooling unit including an evaporator 602 and absorbers 604 and 606. The absorbers 604 and 606 are connected to the evaporator 602 by vapor passageways 608 and 610.

The evaporator is placed within a cavity defined by an insulated box 612. The absorbers 604 and 606 are placed on the external portion of the insulated box 612. The entire insert can then be placed in an external container 614 for shipment, such as a corrugated cardboard box. As is discussed above, the external box can be provided with venting means to assist in the dissipation of heat from the absorbers 604 and 606.

Figure 7:
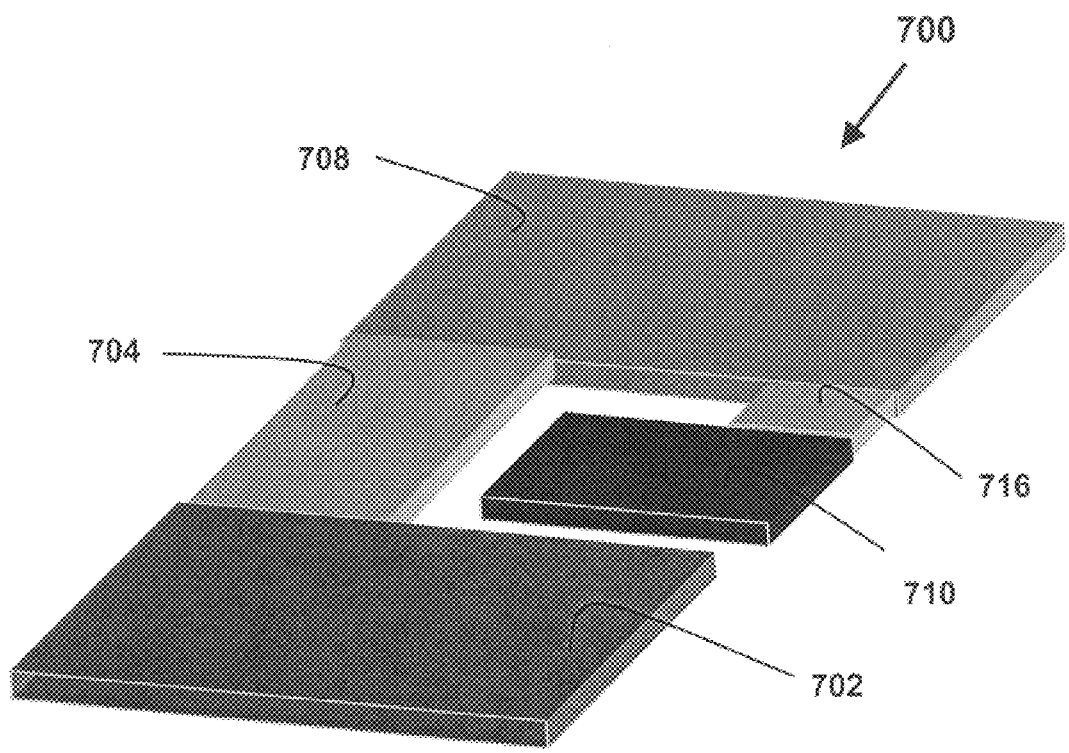
FIG. 7 illustrates a sorption cooling unit in accordance with an embodiment of the present invention.

FIG. 7 illustrates an alternative embodiment of a sorption cooler according to the present invention. The sorption cooler unit 700 is a flat design useful for cooling small packages. The liquid reservoir 710 provides water through a channel 716 to an evaporator 708. The vaporized water then passes through vapor passageway 704 to the absorber 702. The entire assembly can be sealed in a vapor impermeable film, such as metallized polyester. In use, the absorber 702 is thermally isolated from the evaporator 708 and the item to be cooled is positioned adjacent to the large surface of the evaporator 708. The opposite surface of the evaporator 708 can be insulated to maximize the cooling affect.

Table 2 illustrates the cooling performance of the sorption cooling unit in accordance with the present invention as compared to the prior art.

TABLE 2

Cooling Options

| Cooling Mechanism | Nominal Temperature (° C.) | Energy/Mass (W · hr/kg) | Energy/Volume (kW · hr/m³) |
|---|---|---|---|
| Ice/Gel Packs* | 0 | 92 | 92 |
| Dry Ice* | −78 | 208 | 175 |
| Liquid Nitrogen* | −196 | 55 | 44 |
| Phase Change Materials* | Variable | 30–70 | 30–60 |
| Sorption Cooling | −20 to +20 | 180–315 | 145–250 |

*Prior Art

For optimal cooling performance while maintaining reasonable mass and the volume for reduced shipping costs, is desirable that the energy density values (energy/mass and energy/volume) be as high as possible. As is illustrated in Table 2, although ice/gel packs have a relatively low cost, the energy density values are relatively low. Therefore, a large mass and volume of the ice/gel packs is required to cool the shipping container.

Likewise, liquid nitrogen and phase change materials also have very low energy densities. Although dry ice has a higher energy density, dry ice is considered hazardous and is not an acceptable material for air freight.

Absorption cooling in accordance with the present invention provides a useful range of cooling, from −20 C. to +20 C., and has a high energy density. The energy density values listed for the sorption cooler are based upon a desiccant absorption capacity of 50 weight percent to 200 weight percent and a total mass or volume based on the sum of the liquid and the desiccant. The actual value will depend on the desiccant capacity and the packaging configuration. Preferably, the mass energy density is at least about 100 W·hr/kg, more preferably at least about 180 W·hr/kg. Further, the volume energy density is at least about 80 kW·hr/m³ and more preferably is at least about 150 kW·hr/m³.

According to another embodiment of the present invention, a multiple stage sorption cooling unit is provided to cool the shipping container. A multiple stage sorption cooling unit is particularly useful when the product must be maintained at very low temperatures, such as not greater than 0° C.

Figure 8:
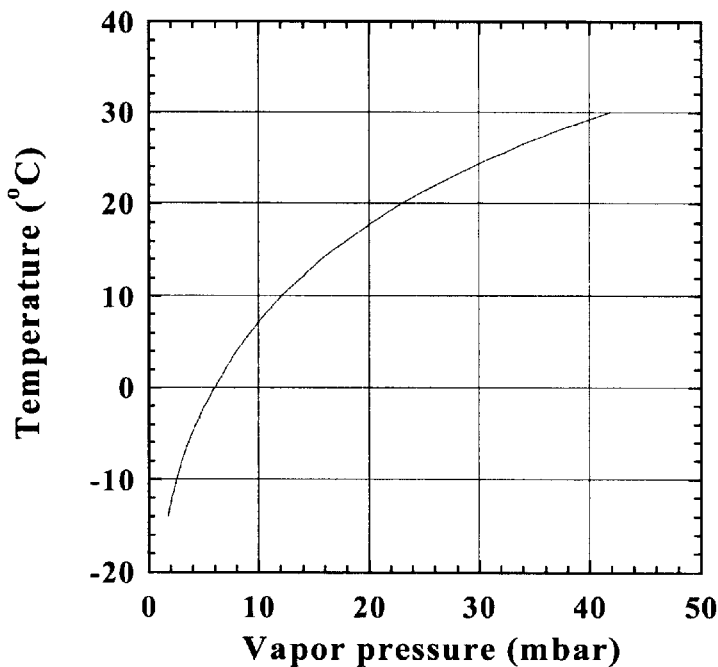
FIG. 8 illustrates the vapor pressure of water as a function of temperature.

When liquid water is evaporated, there is an equilibrium vapor pressure of the water that is a function of the temperature of the water. For different applications of the shipping container, different liquid temperatures are needed to maintain the desired temperature within the container. For example, water temperatures of less than 10° C. are desired for the 2° C. to 8° C. shipping container and less than 0° C. for a frozen product. The equilibrium water vapor pressure for these different temperatures is illustrated in FIG. 8. As the temperature increases, the equilibrium vapor pressure also increases.

Figure 9:
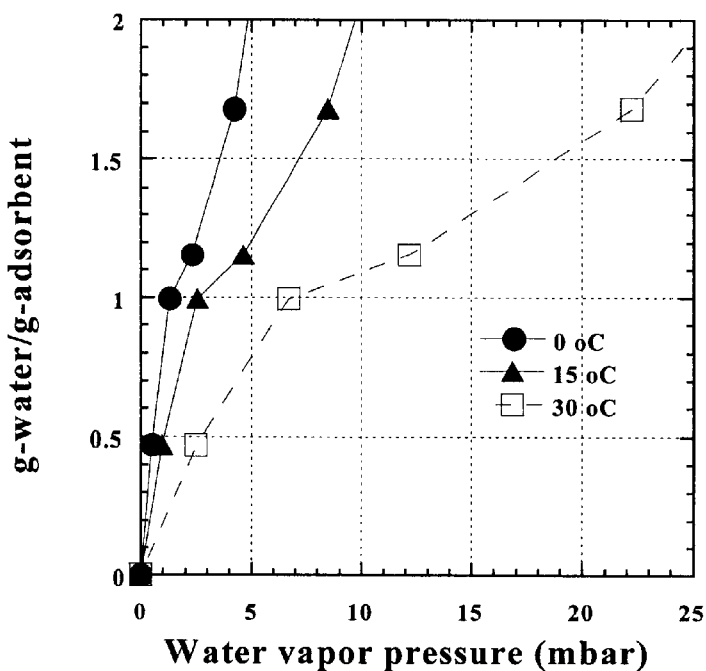
FIG. 9 illustrates the capacity of a selected desiccant as a function of water vapor pressure and temperature.

As is illustrated by FIG. 3, the capacity of a desiccant also depends upon the water vapor pressure. Specifically, as the vapor pressure increases, the capacity of the desiccant to absorb water also increases. Thus, the capacity of the desiccant is also dependent upon the temperature of the water. This is illustrated by FIG. 9 for three different temperatures. The practical result is that if a large temperature difference is needed between the evaporator and the desiccant (e.g., a very low evaporator temperature is needed), the absorption capacity of the desiccant will be relatively low.

According to one embodiment of the present invention, a multiple stage sorption cooler is utilized to address this problem. In a multiple stage sorption cooler, two evaporators are used wherein the first evaporator cools the product cavity and the second evaporator cools the desiccant bed that associated with the first evaporator. Thus, the effective temperature difference between the first evaporator and the hottest desiccant bed is effectively doubled.

Figure 10:
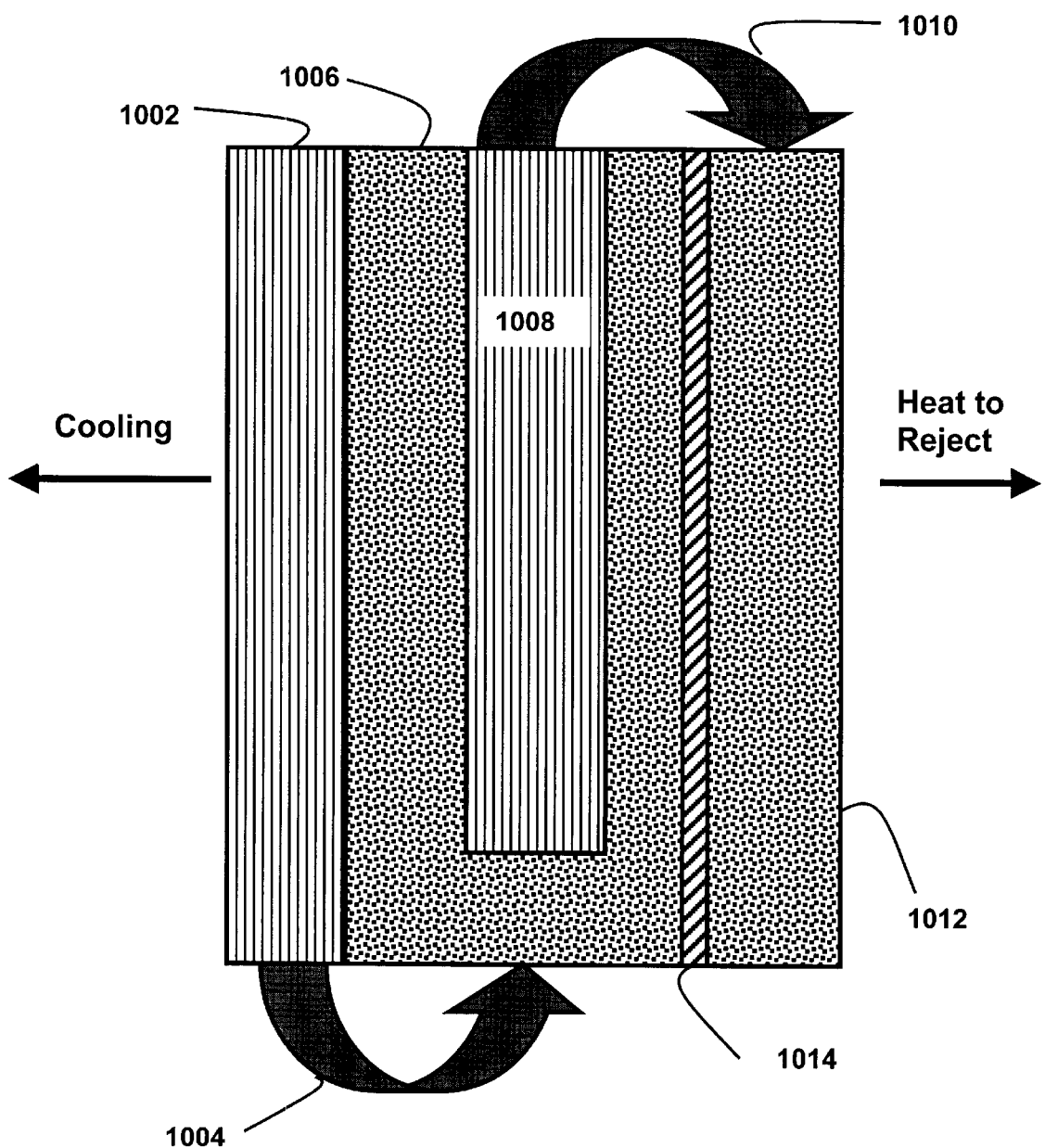
FIG. 10 schematically illustrates a multi-stage sorption cooling unit according to an embodiment of the present invention.

A schematic illustration of a multiple stage sorption cooler in accordance with the present invention is illustrated in FIG. 10. A first evaporator 1002 is utilized to provide cooling to a product cavity. A vapor passageway 1004 provides the vapor to a first absorber 1006 that includes a desiccant. As the first absorber 1006 generates heat due to the absorption of vapor, a second evaporator 1008 is activated to cool the desiccant in the first absorber 1006. This enables the first absorber 1006 to capture more liquid. A second vapor passageway 1010 connects the second evaporator 1008 to a second absorber 1012. A thermal spacer 1014 can be used to isolate the first and second absorbers, if necessary.

To illustrate the foregoing embodiment, consider that 1 kg of water provides approximately 630 W·hr of cooling. If the desiccant absorbs 1 kg of water per kg of desiccant and has a heat of adsorption that is 120% of the heat of vaporization, a single stage sorption cooler that is designed for 10 W of cooling would provide cooling for 63 hours, would weigh 2 kg and would need to reject 12 W of heat. For a two-stage cooler with the same cooler capacity but running at twice the temperature difference between the hot and cold sides, a total of 2.2 kg of water and 2.2 kg of desiccant would be required and the cooler would need to reject 14.4 W of heat. Thus, an acceptably small increase in the mass of liquid and desiccant can provide greatly increased cooling capacity and will be useful for maintaining very low temperatures (e.g., below 0° C.) for extended periods of time.

It will be appreciated that the extension of the two-stage cooler illustrated in FIG. 10 to three or more stages is straightforward. With each extra stage, the amount of heat generated for a given amount of cooling decreases and the mass and volume of both refrigerant and adsorbent increases.

While various embodiments of the present invention have been described in detail, is apparent that modifications and adaptations of those embodiments will occur to those skilled in the art. However, is to be expressly understood that such modifications and adaptations are within the spirit and scope of present invention.

What is claimed is:

1. A temperature-controlled shipping container, comprising:
   a) a shipping container having at least a sidewall and top and bottom walls defining a cavity that is adapted to contain a product therein;
   b) a sorption cooler comprising an evaporator, an absorber and a vapor passageway disposed between said evaporator and said absorber wherein said evaporator is disposed in thermal communication with said cavity to provide cooling to said cavity; and c) a liquid reservoir containing an aqueous-based liquid, wherein said liquid contained in said reservoir can be provided to said evaporator upon activation of said sorption cooler.

2. A temperature-controlled shipping container as recited in claim 1, wherein at least one of said top, bottom and sidewall comprises corrugated cardboard.

3. A temperature-controlled shipping container as recited in claim 1, wherein at least one of said top, bottom and sidewall comprises a material having an insulative value of at least about R-3.

4. A temperature-controlled shipping container as recited in claim 1, wherein at least one of said top, bottom and sidewall comprises expanded polystyrene.

5. A temperature-controlled shipping container as recited in claim 1, wherein at least one of said top, bottom and sidewall comprises a vacuum insulation panel.

6. A temperature-controlled shipping container as recited in claim 1, wherein said vapor passageway comprises means for controlling passage of vapor through said vapor passageway.

7. A temperature-controlled shipping container as recited in claim 1, wherein said vapor passageway comprises microchannels adapted to regulate the flow rate of vapor from said evaporator to said absorber.

8. A temperature-controlled shipping container as recited in claim 1, wherein said sorption cooler further comprises a vapor-permeable membrane disposed between said evaporator and said absorber.

9. A temperature-controlled shipping container as recited in claim 1, wherein said sorption cooler has a mass energy density of at least about 100 W·hr/kg.

10. A temperature-controlled shipping container as recited in claim 1, wherein said sorption cooler has a volume energy density of at least about 80 kW·hr/m$^3$.

11. A temperature-controlled shipping container as recited in claim 1, wherein said aqueous-based liquid is water.

12. A temperature-controlled shipping container as recited in claim 1, wherein said absorber comprises a desiccant.

13. A temperature-controlled shipping container as recited in claim 1, wherein said absorber comprises a desiccant capable of absorbing at least about 0.5 grams of liquid per gram of desiccant at a vapor pressure of about 5 mbar.

14. A temperature controlled shipping container as recited in claim 1 wherein said sorption cooler is a multiple stage sorption cooler comprising at least a second evaporator and second absorber, said second evaporator being in thermal communication with said absorber.

15. A temperature-controlled shipping container as recited in claim 1, wherein said first absorber is at least partially disposed on an outer surface defined by said top wall, bottom wall and sidewalls whereby heat generated in said first absorber is dissipated to the exterior of said container.

16. A temperature-controlled shipping container, comprising:
  a) an insert comprising top, bottom and sidewalls defining a cavity within said insert wherein at lease one of said top, bottom and sidewalls has an insulative value of at least about R-3;
  b) a sorption cooling unit incorporated in said insert wherein said sorption cooling unit comprises an evaporator positioned adjacent to or within said cavity in a manner to provide cooling to said cavity and further comprises an absorber; and
  c) a shipping container substantially encasing said insert.

17. A temperature-controlled shipping container as recited in claim 16, wherein said insert comprises expanded polystyrene.

18. A temperature-controlled shipping container as recited in claim 16, wherein said insert comprises at least a first vacuum insulation panel.

19. A temperature-controlled shipping container as recited in claim 16, wherein said container is fabricated from corrugated cardboard.

20. A temperature-controlled shipping container as recited in claim 16, wherein said sorption cooler has a mass energy density of at least about 100 W·hr/kg.

21. A temperature-controlled shipping container as recited in claim 16, wherein said sorption cooler has a volume energy density of at least about 80 kW·hr/m$^3$.

22. A temperature-controlled shipping container as recited in claim 16, wherein said absorber is at least partially disposed on an outer surface of said insert whereby heat generated in said absorber is dissipated to the exterior of said insert.

23. A temperature-controlled shipping container as recited in claim 16, wherein said absorber is at least partially disposed on an outer surface of said insert whereby heat generated in said absorber is dissipated to the exterior of said insert and wherein said shipping container comprises venting means for dissipating heat generated by said absorber.

24. A temperature-controlled container, comprising:
  a) a top wall, bottom wall and at least a first sidewall defining a cavity wherein at least one of said top, bottom and sidewall has an insulative value of at least about R-3;
  b) a sorption cooling unit wherein said sorption cooling unit comprises an absorber and an evaporator, said evaporator being positioned adjacent to or within said cavity to provide cooling to said cavity and wherein at least a portion of one of said top wall, bottom wall and sidewall is defined by a surface of said evaporator; and
  c) a liquid reservoir wherein liquid contained in said reservoir can be provided to said evaporator upon activation of said sorption cooler.

25. A temperature-controlled container as recited in claim 24, wherein at least one of said top wall, bottom wall and sidewall comprises expanded polystyrene.

26. A temperature-controlled container as recited in claim 24, wherein at least one of said top wall, bottom wall and sidewall comprises at least a first vacuum insulation panel.

27. A temperature-controlled container as recited in claim 24, wherein at least one of said top wall, bottom wall and sidewall is fabricated from cardboard.

28. A temperature-controlled container as recited in claim 24, wherein said sorption cooler has a mass energy density of at least about 100 W·hr/kg.

29. A temperature-controlled container as recited in claim 24, wherein said sorption cooler has a volume energy density of at least about 80 kW·hr/m$^3$.

30. A temperature-controlled container as recited in claim 24, wherein said absorber is at least partially disposed on an outer surface of said top wall, bottom wall and sidewalls whereby heat generated in said absorber is dissipated to the exterior of said container.

31. A temperature-controlled shipping container, comprising:
  a) a container having at least a sidewall and top and bottom walls defining a cavity that is adapted to contain a product therein;
  b) a sorption cooler comprising an evaporator, an absorber, and a vapor passageway including a vapor-permeable membrane disposed between said evaporator and said absorber, wherein said evaporator is disposed in thermal communication with said cavity to provide cooling to said cavity; and c) a liquid reservoir wherein liquid contained in said reservoir can be provided to said evaporator upon activation of said sorption cooler.

32. A temperature-controlled shipping container as recited in claim 31, wherein at least one of said top, bottom and side wall comprises corrugated cardboard.

33. A temperature-controlled shipping container as recited in claim 31, wherein said liquid is water.

34. A temperature-controlled shipping container as recited in claim 31, wherein said absorber comprises a desiccant.

35. A temperature-controlled shipping container, comprising:

a) a shipping container having at least a sidewall and top and bottom walls defining a cavity that is adapted to contain a product therein; and b) a sorption cooler, comprising:
 i) a liquid reservoir adapted to contain a liquid;
 ii) an evaporator disposed in thermal communication with said cavity to provide cooling to said cavity;
 iii) an absorber, wherein said absorber is thermally isolated from said cavity; and
 iv) means for supplying liquid from said liquid reservoir to said evaporator upon activation of said sorption cooler, wherein said evaporator is at a lower pressure than said liquid reservoir and said means for supplying liquid exposes said liquid to the lower pressure in said evaporator.

36. A temperature-controlled shipping container as recited in claim 35, wherein said absorber comprises a desiccant.

37. A temperature-controlled shipping container as recited in claim 35, wherein said means for supplying liquid comprises a valving mechanism.

38. A temperature-controlled shipping container as recited in claim 35, wherein at least one of said top, bottom and sidewalls comprises corrugated cardboard.

39. A temperature-controlled shipping container as recited in claim 35, wherein at least one of said top, bottom and sidewall comprises a material having an insulative value of at least about R-3.

40. A temperature-controlled shipping container as recited in claim 35, wherein at least one of said top, bottom and sidewall comprises expanded polystyrene.

41. A temperature-controlled shipping container as recited in claim 35, wherein said reservoir comprises a liquid and wherein said liquid is an aqueous-based liquid.

42. A temperature-controlled shipping container as recited in claim 35, wherein said absorber is in thermal communication with the exterior of said container.

* * * * *